(12) United States Patent
Kitahashi

(10) Patent No.: US 12,395,712 B2
(45) Date of Patent: Aug. 19, 2025

(54) DISPLAY SYSTEM AND DISPLAY METHOD

(71) Applicant: Komatsu Ltd., Tokyo (JP)

(72) Inventor: Masamitsu Kitahashi, Tokyo (JP)

(73) Assignee: KOMATSU LTD., Tokyo (JP)

(*) Notice: Subject to any disclaimer, the term of this patent is extended or adjusted under 35 U.S.C. 154(b) by 80 days.

(21) Appl. No.: 18/039,591

(22) PCT Filed: Jan. 11, 2022

(86) PCT No.: PCT/JP2022/000500
§ 371 (c)(1),
(2) Date: May 31, 2023

(87) PCT Pub. No.: WO2022/163337
PCT Pub. Date: Aug. 4, 2022

(65) Prior Publication Data
US 2024/0015374 A1 Jan. 11, 2024

(30) Foreign Application Priority Data

Jan. 29, 2021 (JP) ................................. 2021-013735

(51) Int. Cl.
H04N 23/11 (2023.01)
G06F 3/14 (2006.01)
(Continued)

(52) U.S. Cl.
CPC ............... *H04N 23/11* (2023.01); *G06F 3/14* (2013.01); *G06T 5/50* (2013.01); *G06V 10/761* (2022.01);
(Continued)

(58) Field of Classification Search
CPC .. H04N 23/11; H04N 7/18; G06F 3/14; G06T 5/50; G06T 2207/10048;
(Continued)

(56) References Cited

U.S. PATENT DOCUMENTS 6,067,110 A    5/2000  Nonaka et al.
9,083,897 B2   7/2015  Hogasten et al.
(Continued)

FOREIGN PATENT DOCUMENTS

CN    104537786 A    4/2015
CN    106683039 A    5/2017
(Continued)

OTHER PUBLICATIONS

Office Action dated Mar. 25, 2024, issued in the corresponding Australian Patent application No. 2022214854.
(Continued)

*Primary Examiner* — Nasim N Nirjhar
(74) *Attorney, Agent, or Firm* — Troutman Pepper Locke LLP; James E. Armstrong, IV; Joshua L. Jones

(57) ABSTRACT

A display method includes: acquiring a visible light image of a first target captured by a visible light imaging device; acquiring an infrared image of a second target captured by an infrared imaging device; calculating a visible light distance from the visible light imaging device to the first target for each of first partitioned areas defined in the visible light image; calculating an infrared distance from the infrared imaging device to the second target for each of second partitioned areas defined in the infrared image to correspond to the first partitioned areas; determining whether a difference between the visible light distance and the infrared distance is larger than a threshold for one of the first partitioned areas and one of the second partitioned areas corresponding to each other; combining the second partitioned area in which the difference is larger than the threshold with the visible light image to be displayed.

10 Claims, 12 Drawing Sheets

(51) Int. Cl.
*G06T 5/50* (2006.01)
*G06V 10/74* (2022.01)

(52) U.S. Cl.
CPC ............. *G06T 2207/10048* (2013.01); *G06T 2207/20221* (2013.01)

(58) Field of Classification Search
CPC .......... G06T 2207/20221; G06T 2207/10024; G06V 10/761; G09G 2320/0686; G09G 2340/12; G09G 2370/20; B60R 1/00; B60R 1/20
See application file for complete search history.

(56) References Cited

U.S. PATENT DOCUMENTS

| | | |
|---|---|---|
| 2013/0250070 A1 | 9/2013 | Takayama |
| 2014/0285672 A1 | 9/2014 | Hogasten et al. |
| 2014/0368640 A1 | 12/2014 | Strandemar et al. |
| 2017/0195548 A1 | 7/2017 | McManus et al. |
| 2017/0244911 A1 | 8/2017 | Strandemar et al. |
| 2020/0053297 A1* | 2/2020 | Tokizaki ................ H04N 23/60 |
| 2020/0300087 A1 | 9/2020 | Davis et al. |
| 2020/0336655 A1 | 10/2020 | Hsieh et al. |
| 2023/0177709 A1* | 6/2023 | Lee ........................... G06T 5/50 |
| | | 382/106 |

FOREIGN PATENT DOCUMENTS

| | | |
|---|---|---|
| JP | H09-37147 A | 2/1997 |
| JP | 2008-230358 A | 10/2008 |
| JP | 2009-174854 A | 8/2009 |
| JP | 2012-27773 A | 2/2012 |
| JP | 2018-106239 A | 7/2018 |
| WO | 2012/073722 A1 | 6/2012 |

OTHER PUBLICATIONS

H. Li et al., "Image Registration and Fusion of Visible and Infrared Integrated Camera for Medium-Altitude Unmanned Aerial Vehicle Remote Sensing," Remote Sensing, 9, 441, 2017, pp. 1-29. (cited in the Mar. 25, 2024 Office Action issued for AU2022214854).

A. V. Vanmali et al., "Visible and NIR image fusion using weight-map-guided Laplacian-Gaussian pyramid for improving scene visibility," Sadhana, vol. 42, No. 7, 2017, pp. 1063-1082. (cited in the Mar. 25, 2024 Office Action issued for AU2022214854).

Office Action dated Sep. 19, 2024, issued in the corresponding Canadian Patent application No. 3203152.

* cited by examiner

DISPLAY SYSTEM AND DISPLAY METHOD

FIELD

The present disclosure relates to a display system and a display method.

BACKGROUND

In the technical field related to the display system, there has been known an image processing apparatus as disclosed in Patent Literature 1.

CITATION LIST

Patent Literature

Patent Literature 1: JP 2018-106239 A

SUMMARY

Technical Problem

In the technical field related to the work machine, a technique of capturing an image around the work machine using a visible light imaging device has been known. By providing an image captured by the visible light imaging device to an operator of the work machine, the operator can check a situation around the work machine. Dust may be generated due to work performed by the work machine. In addition, work may be performed by the work machine in a situation where fog is generated. When dust or fog is generated, an image captured by the visible light imaging device may be unclear. In addition, when work is performed by the work machine at night, an image captured by the visible light imaging device may be unclear. Furthermore, when an imaging target is imaged in a backlit state, an image captured by the visible light imaging device may be unclear.

An object of the present disclosure is to provide a situation around a work machine to an operator of the work machine even when an event in which an image captured by a visible light imaging device is unclear occurs.

Solution to Problem

According to an aspect of the present invention, a display system comprises: a visible light image acquisition unit that acquires a visible light image indicating an image of a first target captured by a visible light imaging device provided in a work machine; an infrared image acquisition unit that acquires an infrared image indicating an image of a second target captured by an infrared imaging device provided in the work machine; a visible light distance calculation unit that calculates a visible light distance indicating a distance from the visible light imaging device to the first target for each of a plurality of first partitioned areas defined in the visible light image; an infrared distance calculation unit that calculates an infrared distance indicating a distance from the infrared imaging device to the second target for each of a plurality of second partitioned areas defined in the infrared image to correspond to the first partitioned areas; a determination unit that determines whether a difference between the visible light distance and the infrared distance is equal to or larger than a distance threshold for one of the first partitioned areas and one of the second partitioned areas corresponding to each other; a combining unit that combines the second partitioned area in which the difference is equal to or larger than the distance threshold with the visible light image to generate a combined image; and a display output unit that outputs the combined image such that the combined image is displayed on a display device.

Advantageous Effects of Invention

According to the present disclosure, it is possible to provide a situation around the work machine to an operator of the work machine even when an event in which an image captured by the visible light imaging device is unclear occurs.

DESCRIPTION OF EMBODIMENTS

Hereinafter, embodiments according to the present disclosure will be described with reference to the drawings, but the present disclosure is not limited to the embodiments. The components of the embodiments to be described below can be appropriately combined. In addition, some of the components may not be used.

[Remote Operation System]

Figure 1:
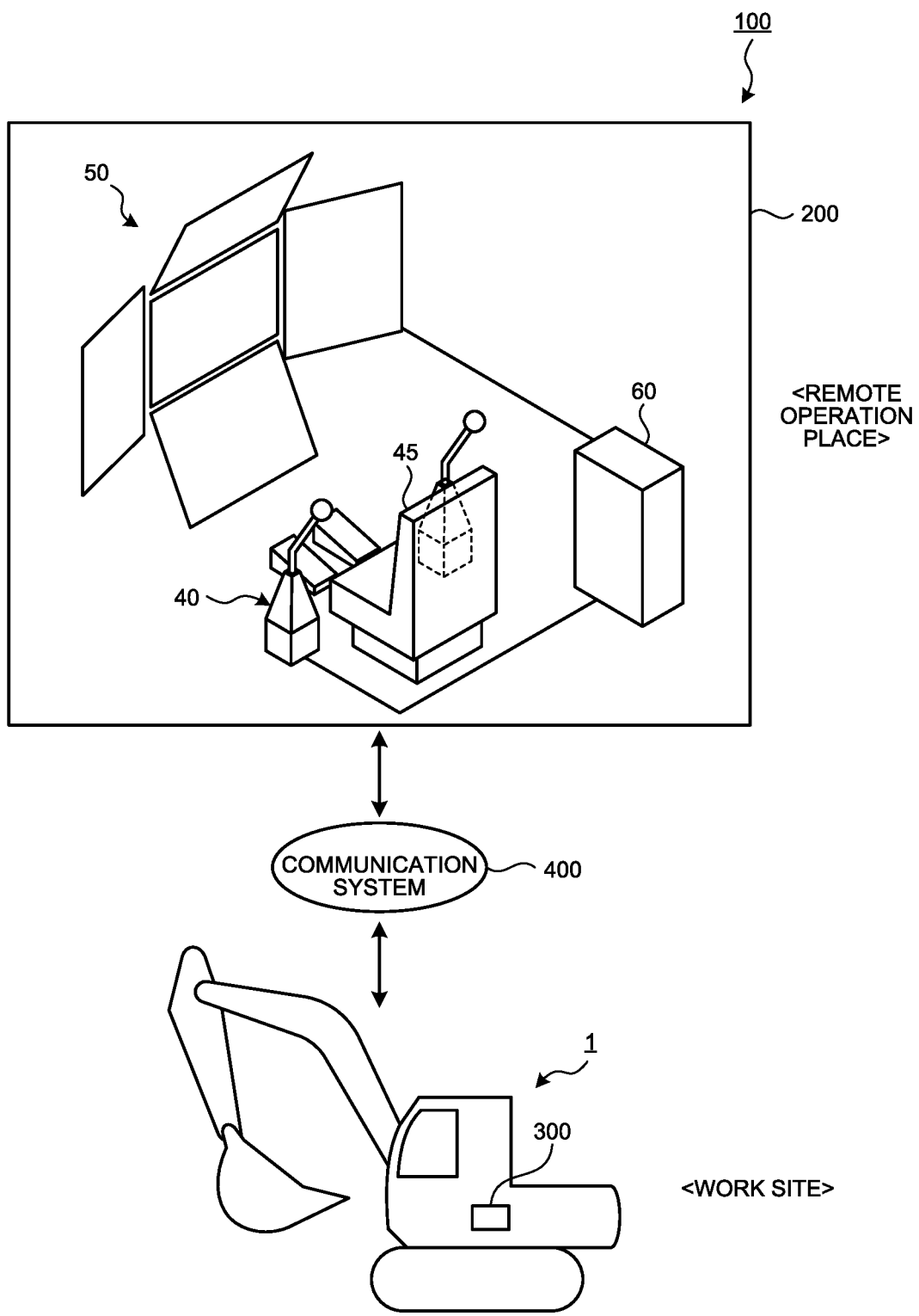
FIG. 1 is a schematic diagram illustrating a remote operation system of a work machine according to an embodiment.

FIG. 1 is a schematic diagram illustrating a remote operation system 100 of a work machine 1 according to the embodiment. The remote operation system 100 remotely operates the work machine 1 present at a work site. At least a part of the remote operation system 100 is disposed in a remote operation chamber 200 at a remote operation place.

The remote operation system 100 includes a remote operation device 40, a display device 50, and a control device 60.

The remote operation device 40 is disposed in the remote operation chamber 200 outside the work machine 1. The remote operation device 40 is operated by an operator in the remote operation chamber 200. The operator can operate the remote operation device 40 while seated on an operation seat 45.

The display device 50 is disposed in the remote operation chamber 200 outside the work machine 1. The display device 50 displays an image of the work site. The image of the work site includes an image in a predetermined range from the work machine 1. The image in the predetermined range from the work machine 1 includes at least an image of a work target of the work machine 1. The work target of the work machine 1 includes a construction target of the work machine 1.

The display device 50 includes a flat panel display such as a liquid crystal display (LCD) or an organic electroluminescence display (OELD). In the embodiment, the display device 50 includes a plurality of flat panel displays arranged adjacent to each other. The display device 50 may include one flat panel display.

The operator operates the remote operation device 40 while checking the image of the work site displayed on the display device 50. The work machine 1 is remotely operated by the remote operation device 40.

The control device 60 is disposed in the remote operation chamber 200 outside the work machine 1. The control device 60 includes a computer system.

The work machine 1 includes a control device 300. The control device 300 includes a computer system.

The control device 60 and the control device 300 communicate with each other via a communication system 400. Examples of the communication system 400 include the Internet, a local area network (LAN), a mobile phone communication network, and a satellite communication network.

[Work Machine]

Figure 2:
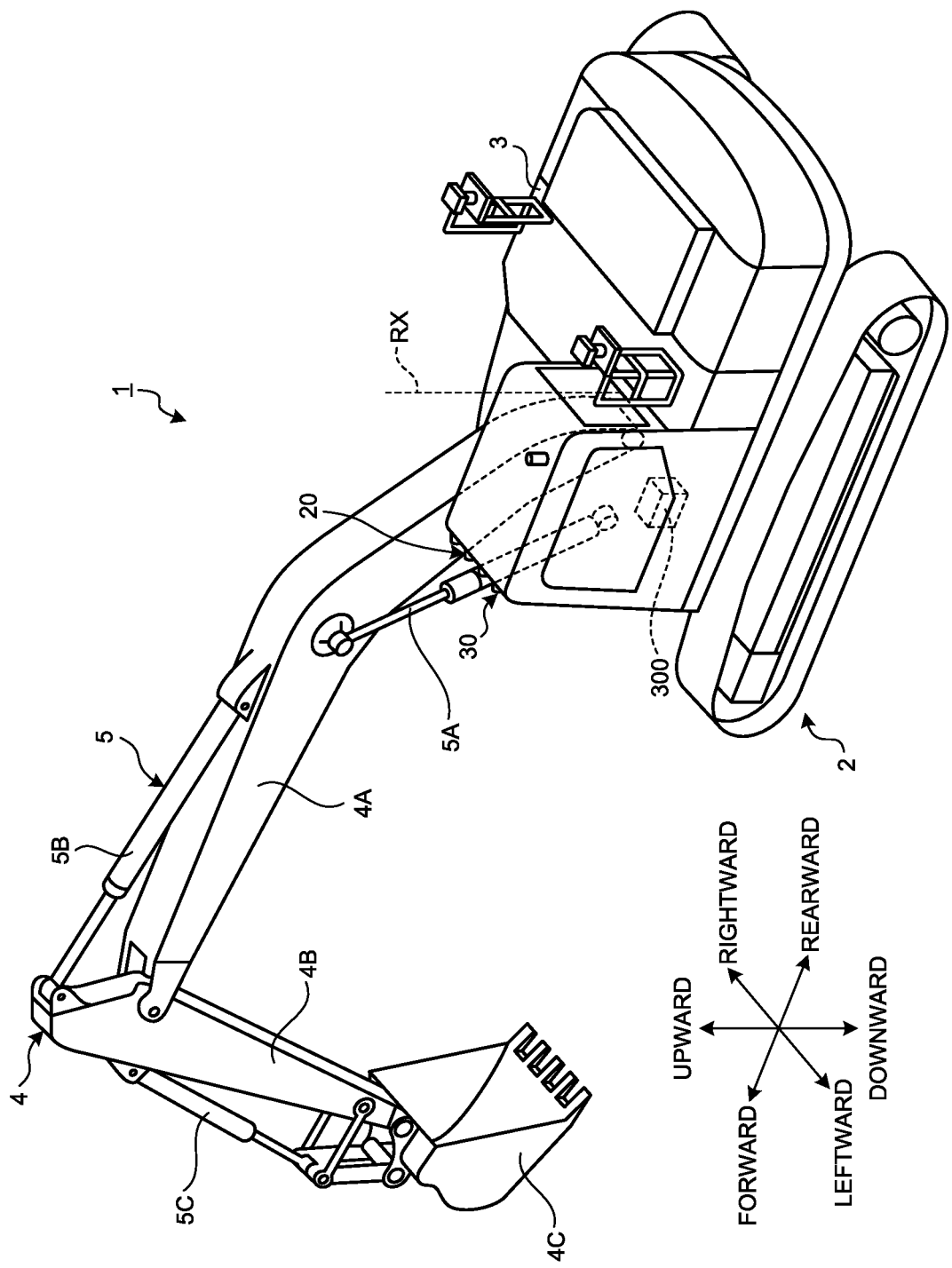
FIG. 2 is a perspective view illustrating the work machine according to the embodiment.

FIG. 2 is a perspective view illustrating the work machine 1 according to the embodiment. In the embodiment, it is assumed that the work machine 1 is an excavator. The work machine 1 operates at a work site.

As illustrated in FIG. 2, the work machine 1 includes a traveling body 2, a swing body 3 supported by the traveling body 2, working equipment 4 supported by the swing body 3, a hydraulic cylinder 5 that drives the working equipment 4, a visible light imaging device 20, and an infrared imaging device 30.

The traveling body 2 can travel while supporting the swing body 3. The swing body 3 is swingable about a swing axis RX while being supported by the traveling body 2. The working equipment 4 includes a boom 4A connected to the swing body 3, an arm 4B connected to the boom 4A, and a bucket 4C connected to the arm 4B, and the hydraulic cylinder 5 includes a boom cylinder 5A that drives the boom 4A, an arm cylinder 5B that drives the arm 4B, and a bucket cylinder 5C that drives the bucket 4C.

The direction in which the working equipment 4 exists with respect to the swing axis RX is a forward direction, and the opposite direction of the forward direction is a rearward direction. One of leftward and rightward directions with respect to the swing axis RX is a rightward direction, and the opposite direction of the rightward direction is a leftward direction. A direction away from a ground contact surface of the traveling body 2 is an upward direction, and a direction opposite to the upward direction is a downward direction.

The visible light imaging device 20 images a work site. The visible light imaging device 20 is provided in the work machine 1. In the embodiment, the visible light imaging device 20 is provided in the swing body 3. The visible light imaging device 20 captures an image in a predetermined range from the work machine 1. The visible light imaging device 20 acquires an image in a wavelength range of visible light. The wavelength range of visible light is, for example, 360 [nm] to 830 [nm].

The infrared imaging device 30 images a work site. The infrared imaging device 30 is provided in the work machine 1. In the embodiment, the infrared imaging device 30 is provided in the swing body 3. The infrared imaging device 30 captures an image in a predetermined range from the work machine 1. The infrared imaging device acquires an image in a spectral range of infrared light. The spectral range of infrared light is 780 [nm] or more and 100 [μm] or less. In the embodiment, the infrared imaging device 30 acquires an image in a spectral range of far infrared light. The spectral range of the infrared imaging device 30 is, for example, 7.5 [μm] or more and 14 [μm] or less.

Each of the visible light imaging device 20 and the infrared imaging device 30 images an imaging target present around the work machine 1. The imaging target is an object. Examples of the imaging target to be imaged by the visible light imaging device 20 and the infrared imaging device 30 include a construction target of the work machine 1, an excavation target of the working equipment 4, a structure existing at the work site, at least a part of the work machine 1, a work machine different from the work machine 1, and a person (worker) working at the work site.

Each of the visible light imaging device 20 and the infrared imaging device 30 includes an optical system and an image sensor that receives light passing through the optical system. The image sensor includes a couple charged device (CCD) image sensor or a complementary metal oxide semiconductor (CMOS) image sensor.

The imaging range of the visible light imaging device 20 at least partially coincides with the imaging range of the infrared imaging device 30. The imaging range of the visible light imaging device 20 includes a visual field range of the optical system of the visible light imaging device 20. The imaging range of the infrared imaging device 30 includes a visual field range of the optical system of the infrared imaging device 30. In the embodiment, the imaging range of the visible light imaging device 20 coincides with the imaging range of the infrared imaging device 30. Note that it is only required that the imaging range of the visible light imaging device 20 and the imaging range of the infrared imaging device 30 partially coincide with each other.

[Visible Light Imaging Device and Far Infrared Imaging Device]

Figure 3:
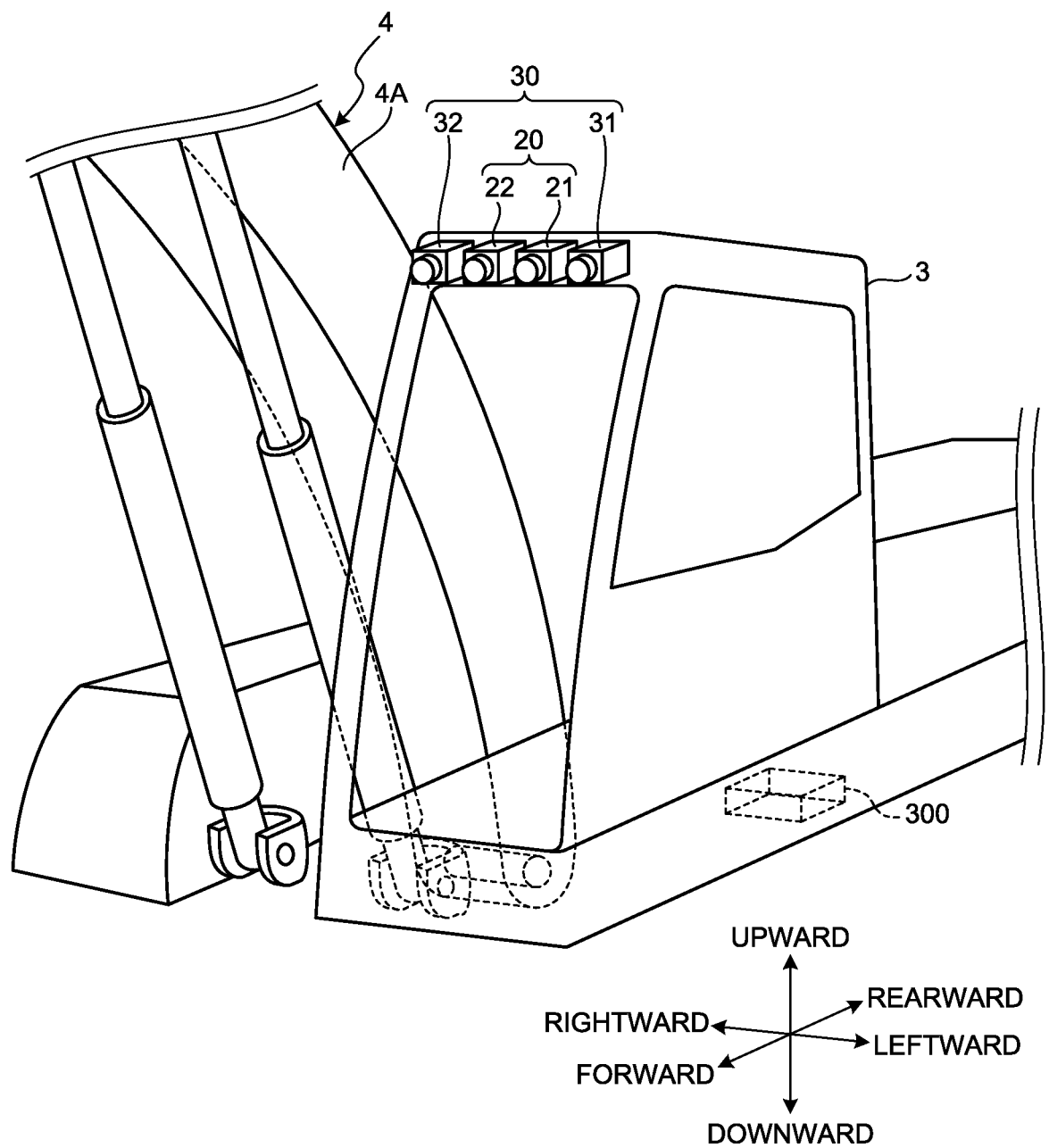
FIG. 3 is a perspective view illustrating a visible light imaging device and a far infrared imaging device according to the embodiment.

FIG. 3 is a perspective view illustrating the visible light imaging device 20 and the infrared imaging device 30 according to the embodiment. As illustrated in FIG. 3, each of the visible light imaging device 20 and the infrared imaging device 30 is disposed in an upper front portion of the swing body 3. Each of the visible light imaging device 20 and the infrared imaging device 30 captures an image in front of the swing body 3. In the embodiment, the predetermined range from the work machine 1 imaged by the visible light imaging device 20 and the infrared imaging device 30 is a range in front of the swing body 3.

In the embodiment, the visible light imaging device 20 includes a first visible light camera 21 and a second visible light camera 22. Each of the first visible light camera 21 and the second visible light camera 22 acquires an image in a wavelength range of visible light. The first visible light camera 21 and the second visible light camera 22 are arranged in a left-right direction.

In the embodiment, the infrared imaging device 30 includes a first infrared camera 31 and a second infrared camera 32. Each of the first infrared camera 31 and the second infrared camera 32 acquires an image in the spectral range of infrared light. In the embodiment, each of the first infrared camera 31 and the second infrared camera 32 is a far infrared camera. The first infrared camera 31 and the second infrared camera 32 are arranged in the left-right direction.

The first infrared camera 31 is disposed to the left of the first visible light camera 21. The second infrared camera 32 is disposed to the right of the second visible light camera 22. The first visible light camera 21 and the second visible light camera 22 are arranged between the first infrared camera 31 and the second infrared camera 32.

Note that the first infrared camera 31 and the second infrared camera 32 may be disposed between the first visible light camera 21 and the second visible light camera 22.

The imaging range of the first visible light camera 21, the imaging range of the second visible light camera 22, the imaging range of the first infrared camera 31, and the imaging range of the second infrared camera 32 coincide with each other. The first visible light camera 21, the second visible light camera 22, the first infrared camera 31, and the second infrared camera 32 simultaneously capture images in a range in front of the swing body 3.

Note that it is only required that the imaging range of the first visible light camera 21 at least partially coincides with the imaging range of the second visible light camera 22. It is only required that the imaging range of the first infrared camera 31 at least partially coincides with the imaging range of the second infrared camera 32. It is only required that the imaging range of the visible light imaging device 20 and the imaging range of the infrared imaging device 30 partially coincide with each other.

In the following description, an image captured by the visible light imaging device 20 will be appropriately referred to as a visible light image Ga, and an image captured by the infrared imaging device 30 will be appropriately referred to as an infrared image Gb.

[Display System]

Figure 4:
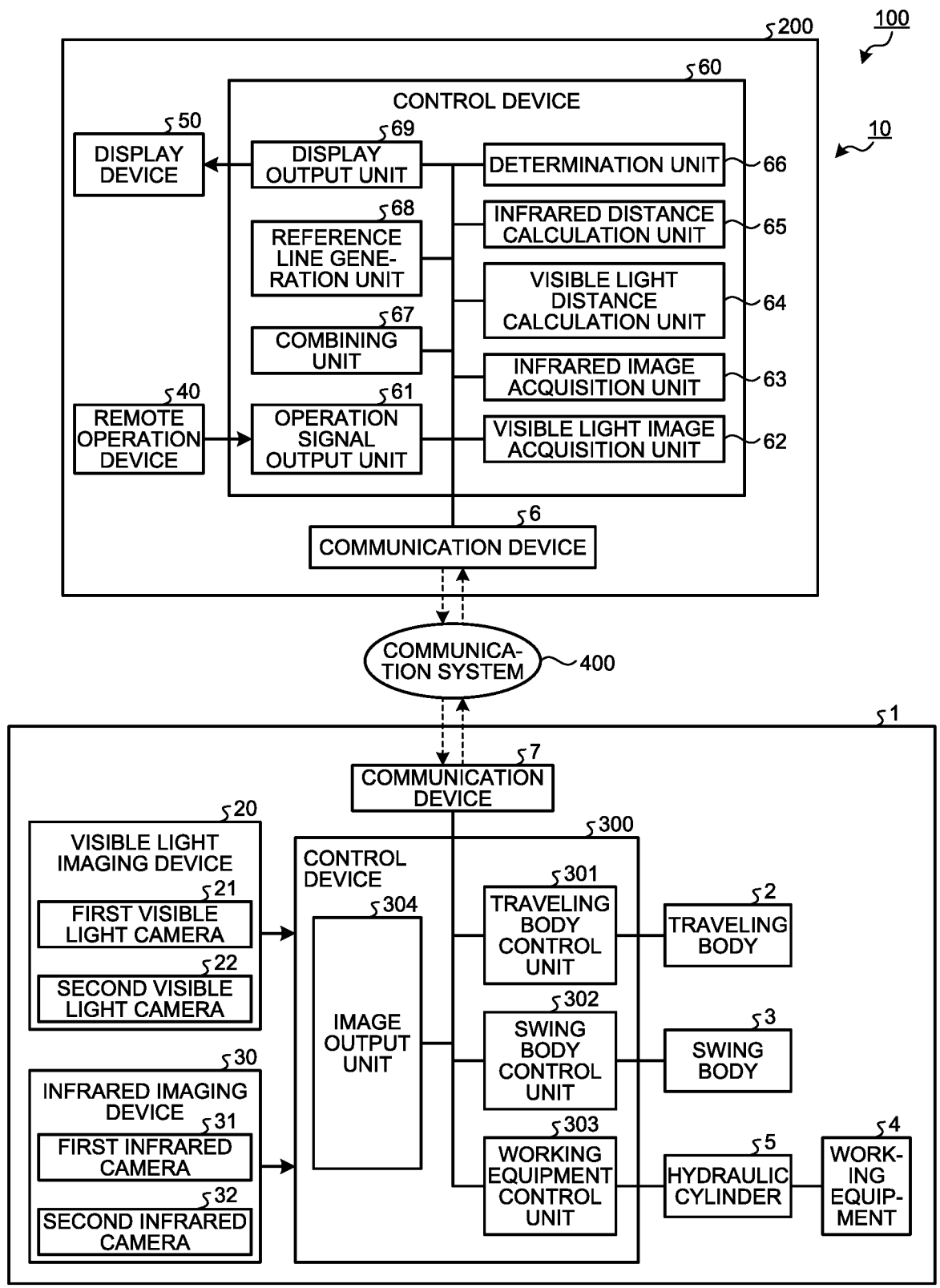
FIG. 4 is a functional block diagram illustrating the remote operation system of the work machine according to the embodiment.

FIG. 4 is a functional block diagram illustrating the remote operation system 100 of the work machine 1 according to the embodiment. As illustrated in FIG. 4, the remote operation system 100 includes a display system 10 that displays an image of a work site. Furthermore, the remote operation system 100 includes a communication device 6 disposed at a remote operation place, a control device 60 connected to the communication device 6, a remote operation device 40 connected to the control device 60, and a display device 50 connected to the control device 60. In addition, the remote operation system 100 includes a communication device 7 disposed in the work machine 1, a control device 300 connected to the communication device 7, a visible light imaging device 20 connected to the control device 300, an infrared imaging device 30 connected to the control device 300, a traveling body 2 controlled by the control device 300, a swing body 3 controlled by the control device 300, and a hydraulic cylinder 5 controlled by the control device 300. The display system 10 includes a visible light imaging device 20, an infrared imaging device 30, a control device 60, and a display device 50.

The control device 300 includes a traveling body control unit 301, a swing body control unit 302, a working equipment control unit 303, and an image output unit 304.

The traveling body control unit 301 receives an operation signal of the remote operation device 40 transmitted from the control device 60. The traveling body control unit 301 outputs a control signal for controlling an operation of the traveling body 2 based on the operation signal of the remote operation device 40.

The swing body control unit 302 receives an operation signal of the remote operation device 40 transmitted from the control device 60. The swing body control unit 302 outputs a control signal for controlling an operation of the swing body 3 based on the operation signal of the remote operation device 40.

The working equipment control unit 303 receives an operation signal of the remote operation device 40 transmitted from the control device 60. The working equipment control unit 303 outputs a control signal for controlling an operation of the working equipment 4 based on the operation signal of the remote operation device 40. The control signal for controlling the working equipment 4 includes a control signal for controlling the hydraulic cylinder 5.

The image output unit 304 outputs visible light image data indicating the visible light image Ga captured by the visible light imaging device 20. Furthermore, the image output unit 304 outputs infrared image data indicating the infrared image Gb captured by the infrared imaging device 30.

The communication device 7 communicates with the communication device 6 via the communication system 400. The communication device 7 receives an operation signal of the remote operation device 40 transmitted from the control device 60 via the communication device 6, and outputs the operation signal to the control device 300. The communication device 7 transmits the visible light image data and the infrared image data output from the image output unit 304 to the communication device 6. The communication device 7 includes an encoder that compresses each of the visible light image data and the infrared image data. Each of the visible light image data and the infrared image data is transmitted from the communication device 7 to the communication device 6 in a compressed state.

The communication device 6 communicates with the communication device 7 via the communication system 400. The communication device 6 transmits an operation signal generated by operating the remote operation device 40 to the communication device 7. The communication device 6 receives the visible light image data and the infrared image data transmitted from the control device 300 via the communication device 7, and outputs the visible light image data and the infrared image data to the control device 60. The communication device 6 includes a decoder that restores each of the compressed visible light image data and infrared image data. Each of the visible light image data and the infrared image data is output from the communication device 6 to the control device 60 in a restored state.

The control device 60 includes an operation signal output unit 61, a visible light image acquisition unit 62, an infrared image acquisition unit 63, a visible light distance calculation unit 64, an infrared distance calculation unit 65, a determination unit 66, a combining unit 67, a reference line generation unit 68, and a display output unit 69.

The operation signal output unit 61 outputs an operation signal for remotely operating the work machine 1. The operation signal for remotely operating the work machine 1 is generated by the remote operation device 40 operated by the operator. The operation signal output unit 61 outputs the operation signal of the remote operation device 40. The communication device 6 transmits the operation signal output from the operation signal output unit 61 to the communication device 7.

The visible light image acquisition unit 62 acquires a visible light image Ga indicating an image of a first target captured by the visible light imaging device 20. The visible light image acquisition unit 62 acquires the visible light image Ga by acquiring visible light image data restored by the communication device 6. The first target includes an imaging target present in the imaging range of the visible light imaging device 20.

The infrared image acquisition unit 63 acquires an infrared image Gb indicating an image of a second target captured by the infrared imaging device 30. The infrared imaging device 30 acquires the infrared image Gb by acquiring infrared image data restored by the communication device 6. The second target includes an imaging target present in the imaging range of the infrared imaging device 30.

The visible light distance calculation unit 64 calculates a visible light distance Da indicating a distance from the visible light imaging device 20 to the first target present in the imaging range of the visible light imaging device 20. In the embodiment, the first visible light camera 21 and the second visible light camera 22 of the visible light imaging device 20 constitute a stereo camera. The visible light distance calculation unit 64 calculates a visible light distance Da from the visible light imaging device 20 to the first target by performing stereo processing on the visible light image Ga captured by the first visible light camera 21 and the visible light image Ga captured by the second visible light camera 22.

The infrared distance calculation unit 65 calculates an infrared distance db indicating a distance from the infrared imaging device 30 to the second target present in the imaging range of the infrared imaging device 30. In the embodiment, the first infrared camera 31 and the second infrared camera 32 of the infrared imaging device 30 constitute a stereo camera. The infrared distance calculation unit 65 calculates an infrared distance db from the infrared imaging device 30 to the second target by performing stereo processing on the infrared image Gb captured by the first infrared camera 31 and the infrared image Gb captured by the second infrared camera 32.

Figure 5:
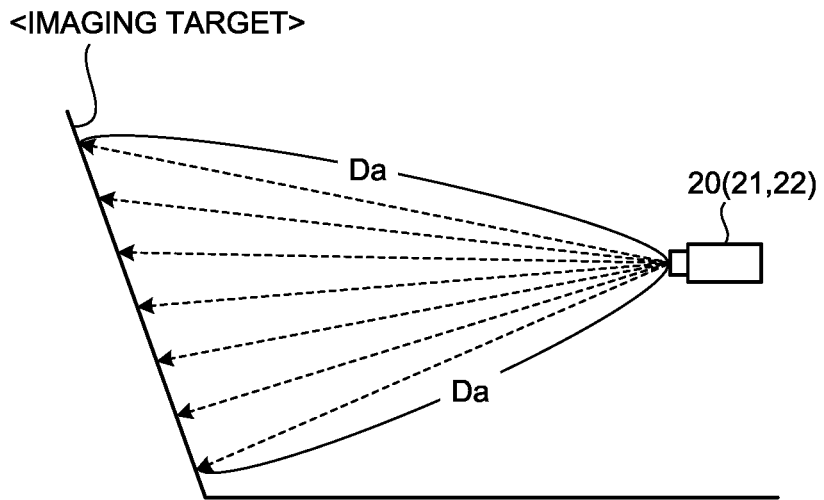
FIG. 5(A) and FIG. 5(B) are schematic diagrams for explaining the visible light imaging device and the infrared imaging device according to the embodiment.
Figure 5:
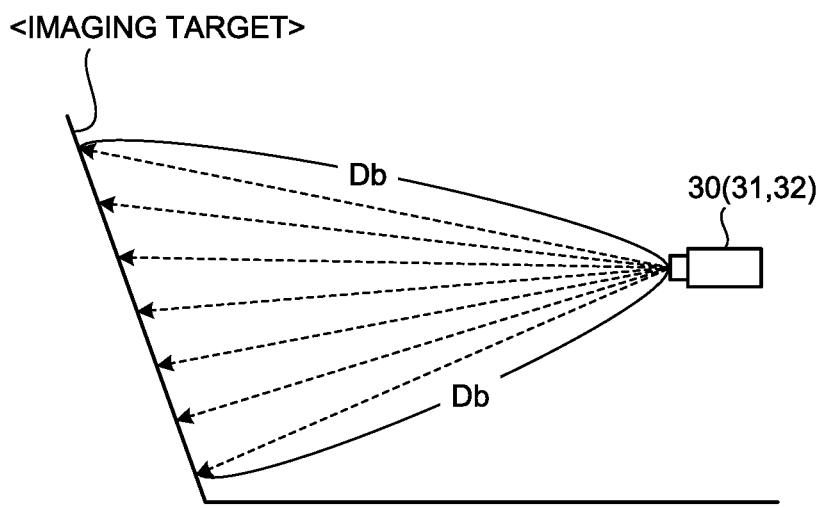

FIG. 5(A) and FIG. 5(B) are schematic diagrams for explaining the visible light imaging device 20 and the infrared imaging device 30 according to the embodiment. As illustrated in FIG. 5(A), the visible light imaging device 20 captures an image in a predetermined range from the work machine 1. As illustrated in FIG. 5(B), the infrared imaging device 30 captures an image in a predetermined range from the work machine 1. The imaging range of the visible light imaging device 20 at least partially coincides with the imaging range of the infrared imaging device 30.

FIG. 5(A) and FIG. 5(B) illustrate a situation in which an event where the visible light image Ga captured by the visible light imaging device 20 is unclear does not occur. In FIG. 5(A) and FIG. 5(B), the first target imaged by the visible light imaging device 20 and the second target imaged by the infrared imaging device 30 are the same imaging target. The visible light distance calculation unit 64 calculates a visible light distance Da from the visible light imaging device 20 to the first target by performing stereo processing on the visible light image Ga captured by the first visible light camera 21 and the visible light image Ga captured by the second visible light camera 22. The infrared distance calculation unit 65 calculates an infrared distance Db from the infrared imaging device 30 to the second target by performing stereo processing on the infrared image Gb captured by the first infrared camera 31 and the infrared image Gb captured by the second infrared camera 32. In FIG. 5(A) and FIG. 5(B), the visible light distance Da and the infrared distance Db are substantially equal.

Figure 6:
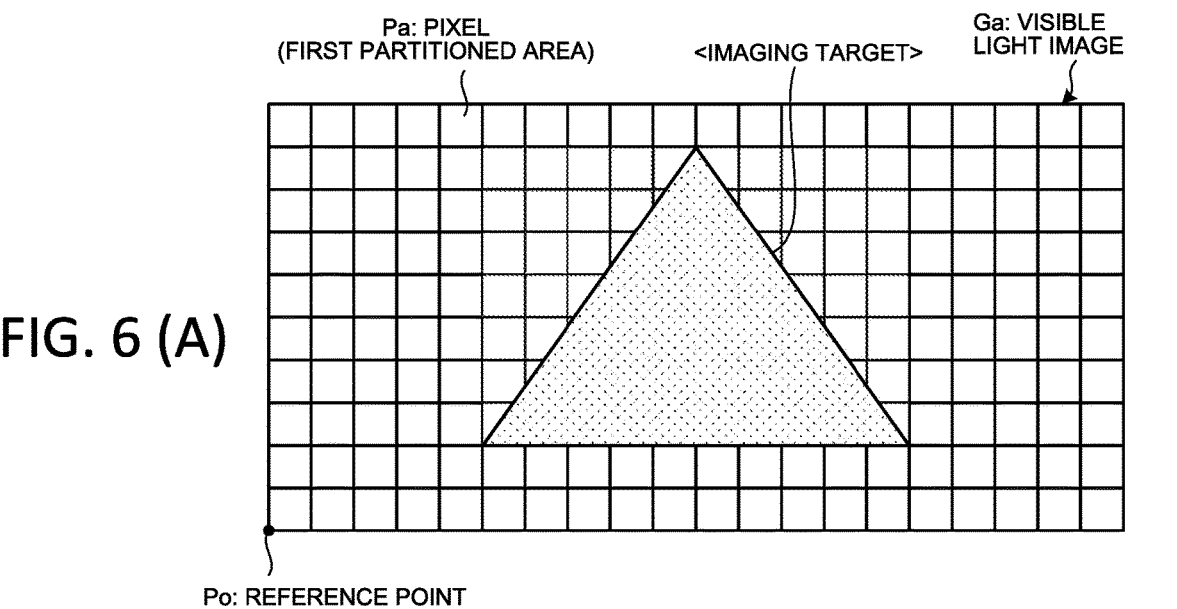
FIG. 6(A) and FIG. 6(B) are schematic diagrams for explaining a visible light image and an infrared image according to the embodiment.
Figure 6:
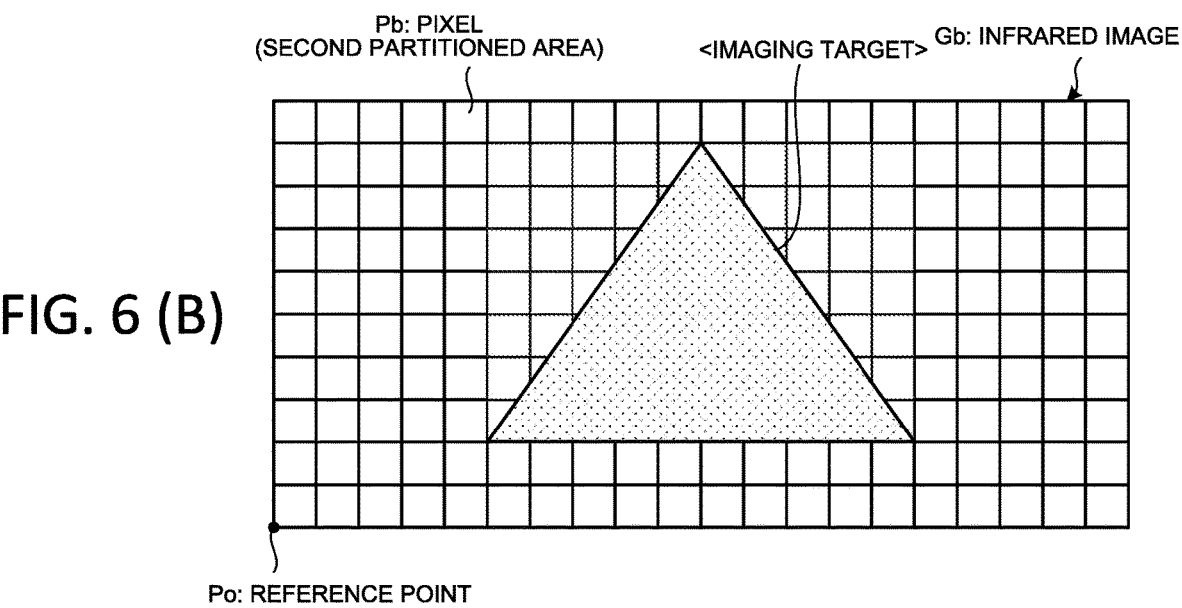

FIG. 6(A) and FIG. 6(B) are schematic diagrams for explaining a visible light image Ga and an infrared image Gb according to the embodiment. FIG. 6(A) and FIG. 6(B) illustrate a visible light image Ga and an infrared image Gb captured when the event where the visible light image Ga captured by the visible light imaging device 20 is unclear does not occur. In FIG. 6(A) and FIG. 6(B), the first target imaged by the visible light imaging device 20 and the second target imaged by the infrared imaging device 30 are the same imaging target. The first target appearing in the visible light image Ga and the second target appearing in the infrared image Gb are the same imaging target.

As illustrated in FIG. 6(A), a plurality of first partitioned areas Pa are defined in the visible light image Ga. The plurality of first partitioned areas Pa are defined in a matrix form in the visible light image Ga. In the embodiment, the first partitioned areas Pa include pixels (pixel areas) of the visible light image Ga. The pixels of the visible light image Ga correspond to pixels of the image sensor of the visible light imaging device 20.

As illustrated in FIG. 6(B), a plurality of second partitioned areas Pb are defined in the infrared image Gb. The plurality of second partitioned areas Pb are defined in a matrix form in the infrared image Gb. In the embodiment, the second partitioned areas Pb include pixels (pixel areas) of the infrared image Gb. The pixels of the infrared image Gb correspond to pixels of the image sensor of the infrared imaging device 30.

As illustrated in FIGS. 6(A) and 6(B), a reference point Po of an image area is set in each of the visible light image Ga and the infrared image Gb. The positions indicated by the reference points Po of the two images coincide with each other, and the first partitioned areas Pa obtained by dividing the visible light image Ga and the second partitioned areas Pb obtained by dividing the infrared image Gb are calibrated to coincide with each other in terms of size and position (the ranges indicated by the images) based on the reference points Po.

In the embodiment, when the first partitioned areas Pa and the second partitioned areas Pb obtained by dividing the images coincides with each other, the structure of the image sensor of the visible light imaging device 20 and the structure of the image sensor of the infrared imaging device 30 may be different. For example, the pixel size of the image sensor of the visible light imaging device 20 and the pixel size of the image sensor of the infrared imaging device 30 may be different, the number of pixels (the number of rows and the number of columns) of the image sensor of the visible light imaging device 20 and the number of pixels (the number of rows and the number of columns) of the image sensor of the infrared imaging device may be different, and the interval between the adjacent pixels in the image sensor of the visible light imaging device 20 and the interval between the adjacent pixels in the image sensor of the infrared imaging device 30 may be different. Furthermore, the structure of the optical system of the visible light imaging device 20 and the structure of the image sensor of the infrared imaging device 30 may also be different. For example, the focal length of the optical system of the visible light imaging device 20 and the focal length of the optical system of the infrared imaging device 30 may be different, and the field of view of the system of the visible light imaging device and the field of view of the optical system of the infrared imaging device 30 may be different.

Therefore, the plurality of first partitioned areas Pa (pixels) defined in the visible light image Ga and the plurality of second partitioned areas Pb (pixels) defined in the infrared image Gb correspond to each other on a one-to-one basis, and the areas indicated by the pixels coincide with each other in terms of position.

Therefore, the size of the first partitioned area Pa is equal to the size of the second partitioned area Pb. The number of first partitioned areas Pa is equal to the number of second partitioned areas Pb.

The visible light distance calculation unit 64 calculates a visible light distance Da for each of the plurality of first partitioned areas Pa defined in the visible light image Ga. The visible light distance calculation unit 64 calculates a visible light distance Da from the visible light imaging device 20 to the first target present in the imaging range of the visible light imaging device 20 for each of the plurality of first partitioned areas Pa of the visible light image Ga.

The infrared distance calculation unit 65 calculates an infrared distance db for each of the plurality of second partitioned areas Pb defined in the infrared image Gb. The infrared distance calculation unit 65 calculates an infrared distance db from the infrared imaging device 30 to the second target present in the imaging range of the infrared imaging device 30 for each of the plurality of second partitioned areas Pb of the infrared image Gb.

The determination unit 66 determines whether a difference between the visible light distance Da and the infrared distance db is equal to or larger than a predetermined distance threshold for one of the first partitioned areas Pa and one of the second partitioned areas Pb corresponding to each other.

Figure 7:
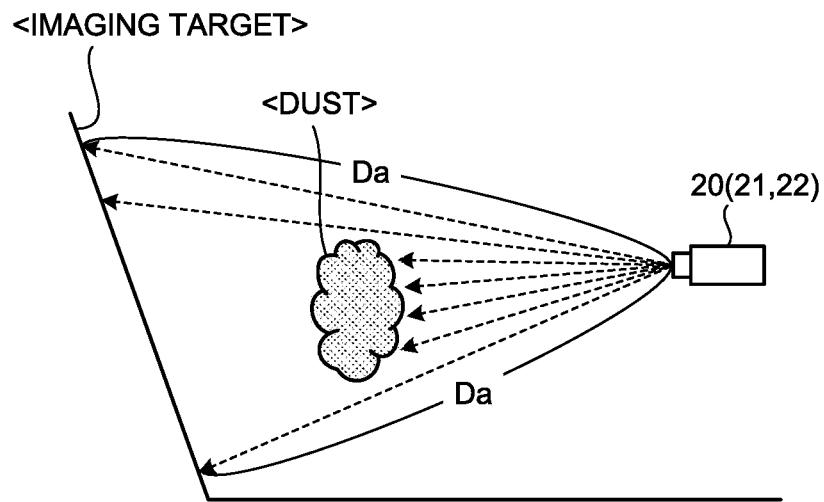
FIG. 7(A) and FIG. 7(B) are schematic diagrams for explaining the visible light imaging device and the infrared imaging device according to the embodiment.
Figure 7:
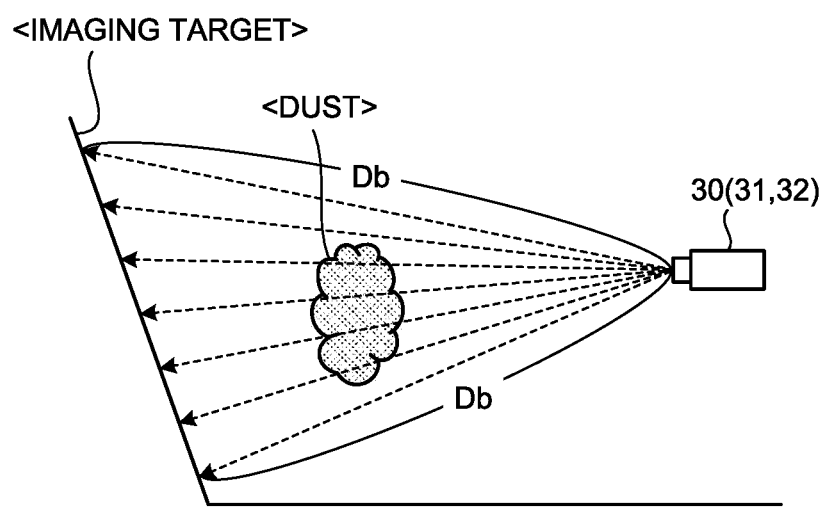

FIG. 7(A) and FIG. 7(B) are schematic diagrams for explaining the visible light imaging device 20 and the infrared imaging device 30 according to the embodiment. FIG. 7(A) and FIG. 7(B) illustrate a situation in which an event that the visible light image Ga captured by the visible light imaging device 20 is unclear occurs.

During the work of the work machine 1, an event where the visible light image Ga is unclear may occur. As illustrated in FIG. 7(A) and FIG. 7(B), generation of dust resulting from the work of the work machine 1 is exemplified as an event where the visible light image Ga is unclear. As illustrated in FIG. 7(A), at least some of the dust may be generated in a space between the visible light imaging device 20 and the imaging target. As illustrated in FIG. 7(B), at least some of the dust may be generated in a space between the infrared imaging device 30 and the imaging target.

The visible light cannot transmit the dust, and the visible light imaging device 20 cannot image the imaging target blocked by the dust. The first target imaged by the visible light imaging device 20 includes the dust and a part of the imaging target.

The infrared light can transmit the dust, and the infrared imaging device 30 can image the imaging target blocked by the dust. The second target imaged by the infrared imaging device 30 substantially does not include the dust, and includes the imaging target.

As described above, the visible light distance calculation unit 64 calculates a visible light distance Da from the visible light imaging device 20 to the first target by performing stereo processing on the visible light image Ga captured by the first visible light camera 21 and the visible light image Ga captured by the second visible light camera 22. The visible light distance Da calculated by the visible light distance calculation unit 64 includes a visible light distance Da from the visible light imaging device 20 to the dust and a visible light distance Da from the visible light imaging device 20 to the imaging target. The visible light distance Da from the visible light imaging device 20 to the dust is shorter than the visible light distance Da from the visible light imaging device 20 to the imaging target.

As described above, the infrared distance calculation unit 65 calculates an infrared distance db from the infrared imaging device 30 to the second target by performing stereo processing on the infrared image Gb captured by the first infrared camera 31 and the infrared image Gb captured by the second infrared camera 32. The infrared distance db calculated by the visible light distance calculation unit 64 does not include an infrared distance db from the infrared imaging device 30 to the dust, but includes an infrared distance db from the infrared imaging device 30 to the imaging target. The visible light distance Da from the visible light imaging device 20 to the dust is shorter than the infrared distance db from the infrared imaging device 30 to the imaging target.

When dust exists in the space between the visible light imaging device 20 and the infrared imaging device 30 and the imaging target as described above, a difference may occur between the visible light distance Da and the infrared distance db. The determination unit 66 can determine whether there is dust by determining whether the difference between the visible light distance Da and the infrared distance db is equal to or greater than a distance threshold. In addition, the determination unit 66 can specify a position of the dust by determining whether the difference between the visible light distance Da and the infrared distance db is equal to or larger than the distance threshold for one of the first partitioned areas Pa and one of the second partitioned areas Pb corresponding to each other.

Figure 8:
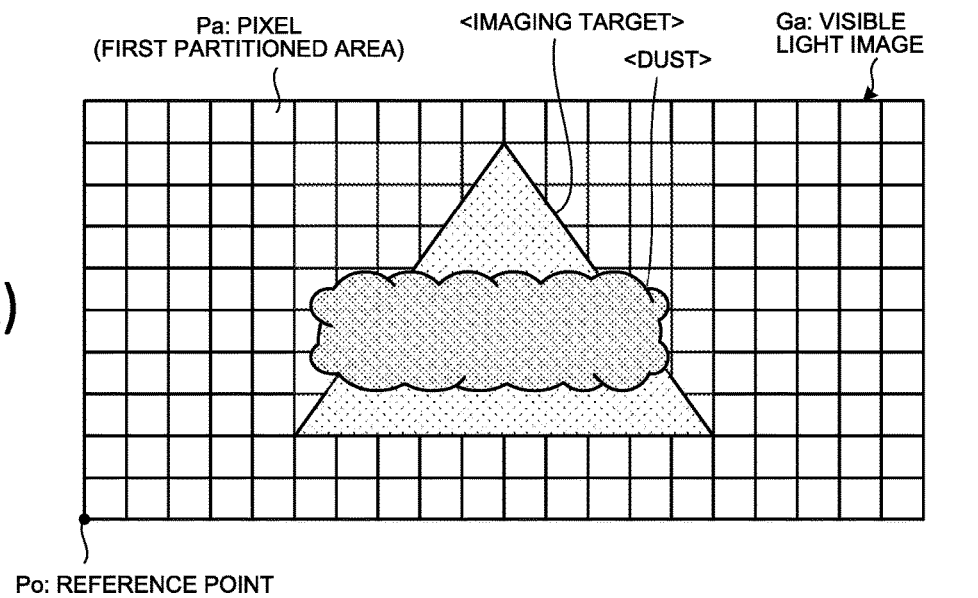
FIG. 8(A) and FIG. 8(B) are schematic diagrams for explaining a visible light image and an infrared image according to the embodiment.
Figure 8:
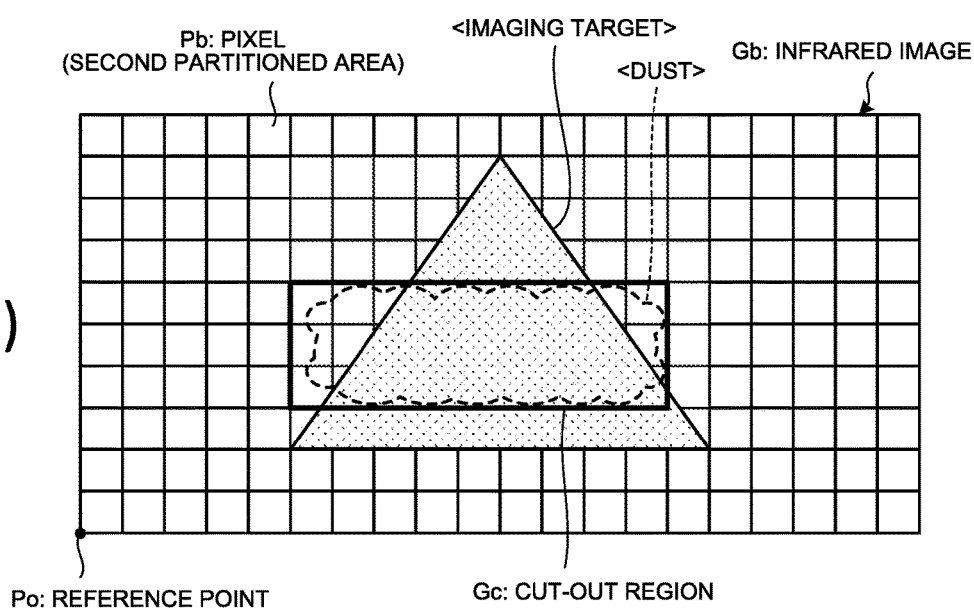

FIG. 8(A) and FIG. 8(B) are schematic diagrams for explaining a visible light image Ga and an infrared image Gb according to the embodiment. FIG. 8(A) and FIG. 8(B) illustrate a visible light image Ga and an infrared image Gb captured when the event where the visible light image Ga captured by the visible light imaging device 20 is unclear occurs. FIG. 8(A) illustrates a visible light image Ga captured in the situation where dust is generated as described with reference to FIG. 7(A). FIG. 8(B) illustrates an infrared image Gb captured in the situation where dust is generated as described with reference to FIG. 7(B).

As illustrated in FIG. 8(A) and FIG. 8(B), the first target imaged by the visible light imaging device 20 and the second target imaged by the infrared imaging device 30 may not coincide with each other due to the dust. The first target imaged by the visible light imaging device 20 includes the dust and a part of the imaging target. The second target imaged by the infrared imaging device 30 substantially does not include the dust, and includes the imaging target.

As illustrated in FIG. 8(A), a part of the imaging target blocked by the dust may not appear in the visible light image Ga. The visible light image Ga includes the dust and a part of the imaging target.

As illustrated in FIG. 8(B), the dust does not appear and the imaging target appears in the infrared image Gb. The infrared image Gb substantially does not include the dust, and includes the imaging target.

The combining unit 67 generate a combined image Gd by combining the second partitioned area Pb in which the difference between the visible light distance Da and the infrared distance db is equal to or larger than the distance threshold and the visible light image Ga.

In the embodiment, the second partitioned area Pb in which the difference between the visible light distance Da and the infrared distance db is equal to or larger than the distance threshold is a plurality of second partitioned areas Pb included in a cut-out region Gc of FIG. 8(B). The second partitioned areas Pb in the cut-out region Gc corresponds to the first partitioned areas Pa in which the dust appears in the visible light image Ga.

The second partitioned areas Pb in the cut-out region Gc are second partitioned areas Pb in which the difference between the visible light distance Da and the infrared distance db is equal to or larger than the distance threshold. In the embodiment, the cut-out region Gc represents an aggregate of a plurality of second partitioned areas Pb in which the difference between the visible light distance Da and the infrared distance db is equal to or larger than the distance threshold. The second partitioned areas Pb outside the cut-out region Gc are second partitioned areas Pb where the difference between the visible light distance Da and the infrared distance db is smaller than the distance threshold.

Figure 9:
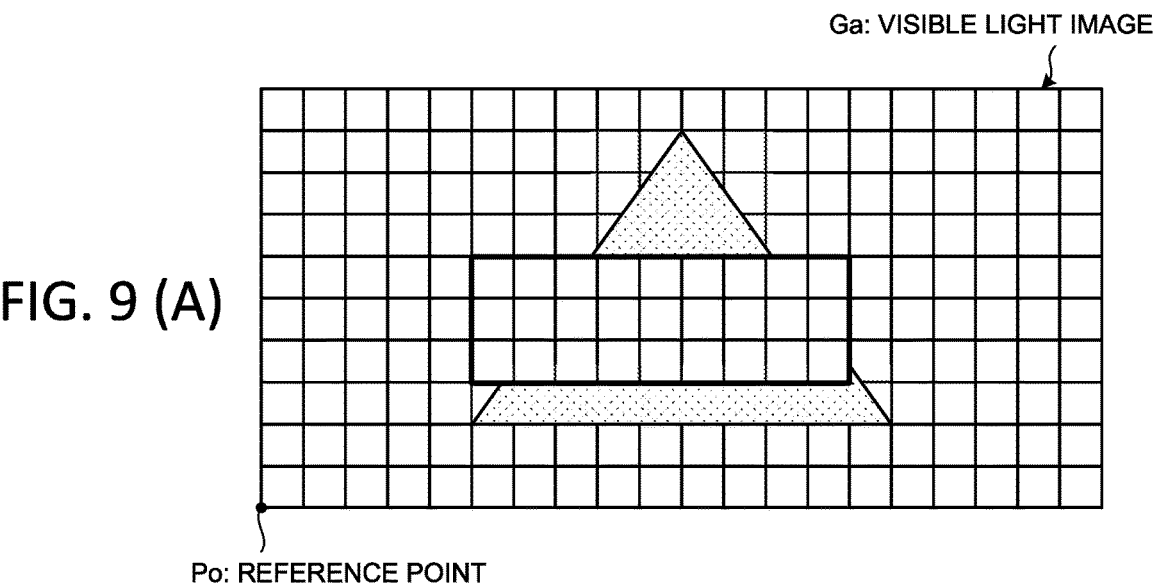
FIG. 9(A) and FIG. 9(B) are schematic diagrams for explaining a method of generating a combined image according to the embodiment.
Figure 9:
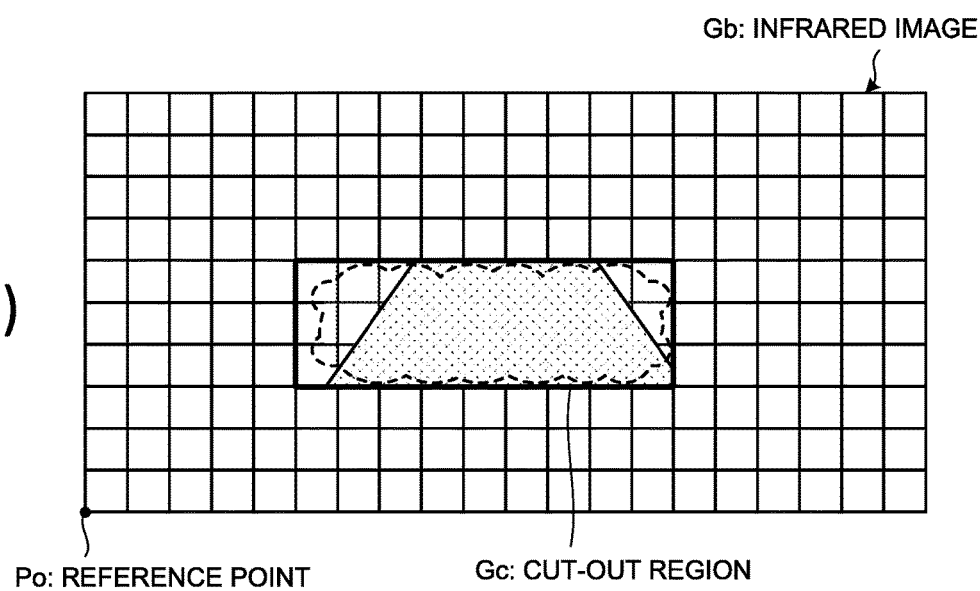
Figure 10:
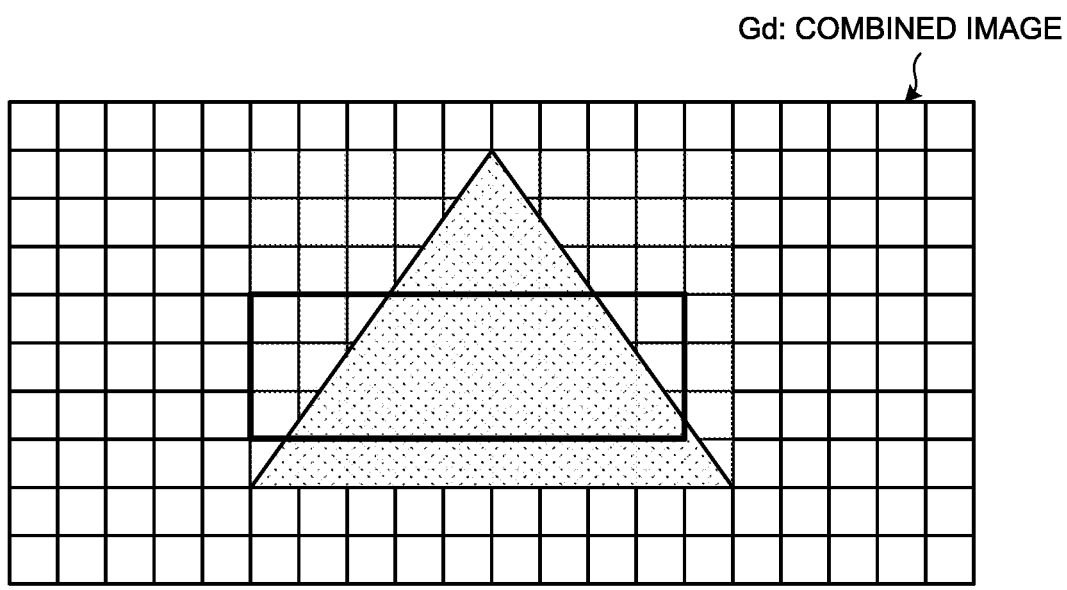
FIG. 10 is a schematic diagram for explaining a method of generating a combined image according to the embodiment.

FIGS. 9 and 10 are schematic diagrams for explaining a method of generating a combined image Gd according to the embodiment.

As illustrated in FIG. 9(B), the combining unit 67 cuts out a cut-out region Gc from the infrared image Gb. That is, the combining unit 67 cuts out a plurality of second partitioned areas Pb in which the difference between the visible light distance Da and the infrared distance db is equal to or larger than the distance threshold from the infrared image Gb.

As illustrated in FIG. 9(A), the combining unit 67 removes a plurality of first partitioned areas Pa corresponding to the cut-out region Gc from the visible light image Ga. That is, the combining unit 67 removes a plurality of first partitioned areas Pa in which the difference between the visible light distance Da and the infrared distance db is equal to or larger than the distance threshold from the visible light image Ga.

The first partitioned areas Pa corresponding to the cut-out region Gc are first partitioned areas Pa in which the difference between the visible light distance Da and the infrared distance db is equal to or larger than the distance threshold. The first partitioned areas Pa that do not correspond to the cut-out region Gc are first partitioned areas Pa in which the difference between the visible light distance Da and the infrared distance db is smaller than the distance threshold.

As illustrated in FIG. 10, the combining unit 67 generates a combined image Gd by combining the cut-out region Gc cut out from the infrared image Gb with the visible light image Ga from which the plurality of first partitioned areas Pa corresponding to the cut-out region Gc have been removed. The combining unit 67 combines the cut-out region Gc with the visible light image Ga so that the cut-out region Gc including a plurality of second partitioned areas Pb in which the difference between the visible light distance Da and the infrared distance db is equal to or greater than the distance threshold are superimposed on the first partitioned areas Pa of the visible light image Ga corresponding to the cut-out region Gc. In the embodiment, the combining unit 67 applies the cut-out region Gc including the plurality of second partitioned areas Pb in which the difference between the visible light distance Da and the infrared distance db is equal to or larger than the distance threshold to a portion of the visible light image Ga from which the first partitioned areas Pa are removed.

Note that the combining unit 67 may perform smoothing processing on a boundary between the visible light image Ga and the cut-out region Gc after the cut-out region Gc is applied to (superimposed on) the visible light image Ga.

As illustrated in FIG. 10, the combined image Gd includes a plurality of second partitioned areas Pb in which the difference between the visible light distance Da and the infrared distance db is equal to or larger than the distance threshold, and a plurality of first partitioned areas Pa in which the difference between the visible light distance Da and the infrared distance db is smaller than the distance threshold. That is, the combined image Gd includes a part of the visible light image Ga and a part of the infrared image Gb.

The reference line generation unit 68 generates a reference line image Ge indicating a distance from the work machine 1 based on the infrared distance db calculated by the infrared distance calculation unit 65.

The display output unit 69 outputs the combined image Gd to the display device 50 so that the combined image Gd generated by the combining unit 67 is displayed on the display device 50. In addition, the display output unit 69 outputs the reference line image Ge to the display device 50 so that the reference line image Ge generated by the reference line generation unit 68 is displayed on the display device 50.

Figure 11:
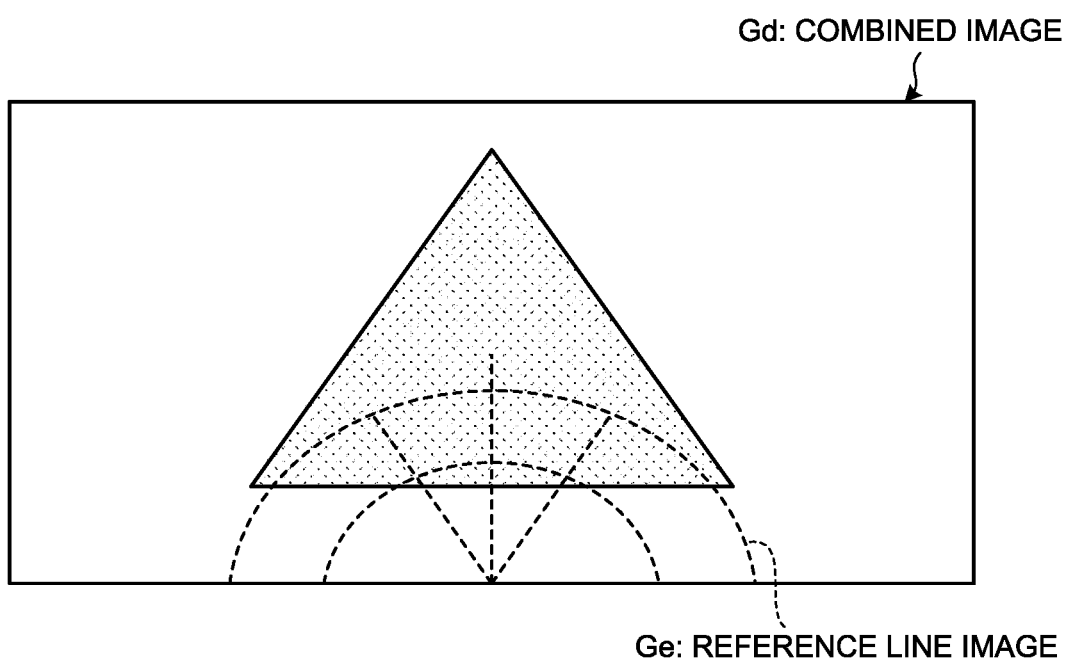
FIG. 11 is a schematic diagram illustrating a combined image and a reference line image displayed on a display device according to the embodiment.

FIG. 11 is a schematic diagram illustrating a combined image Gd and a reference line image Ge displayed on the display device 50 according to the embodiment.

Since the combined image Gd is displayed on the display device 50, the operator of the work machine 1 can recognize a situation around the work machine 1 even if dust is generated by checking the display device 50. In addition, since the reference line image Ge is displayed on the display device 50, the operator of the work machine 1 can recognize a distance from the work machine 1 to the imaging target (construction target) by checking the display device 50.

[Display Method]

Figure 12:
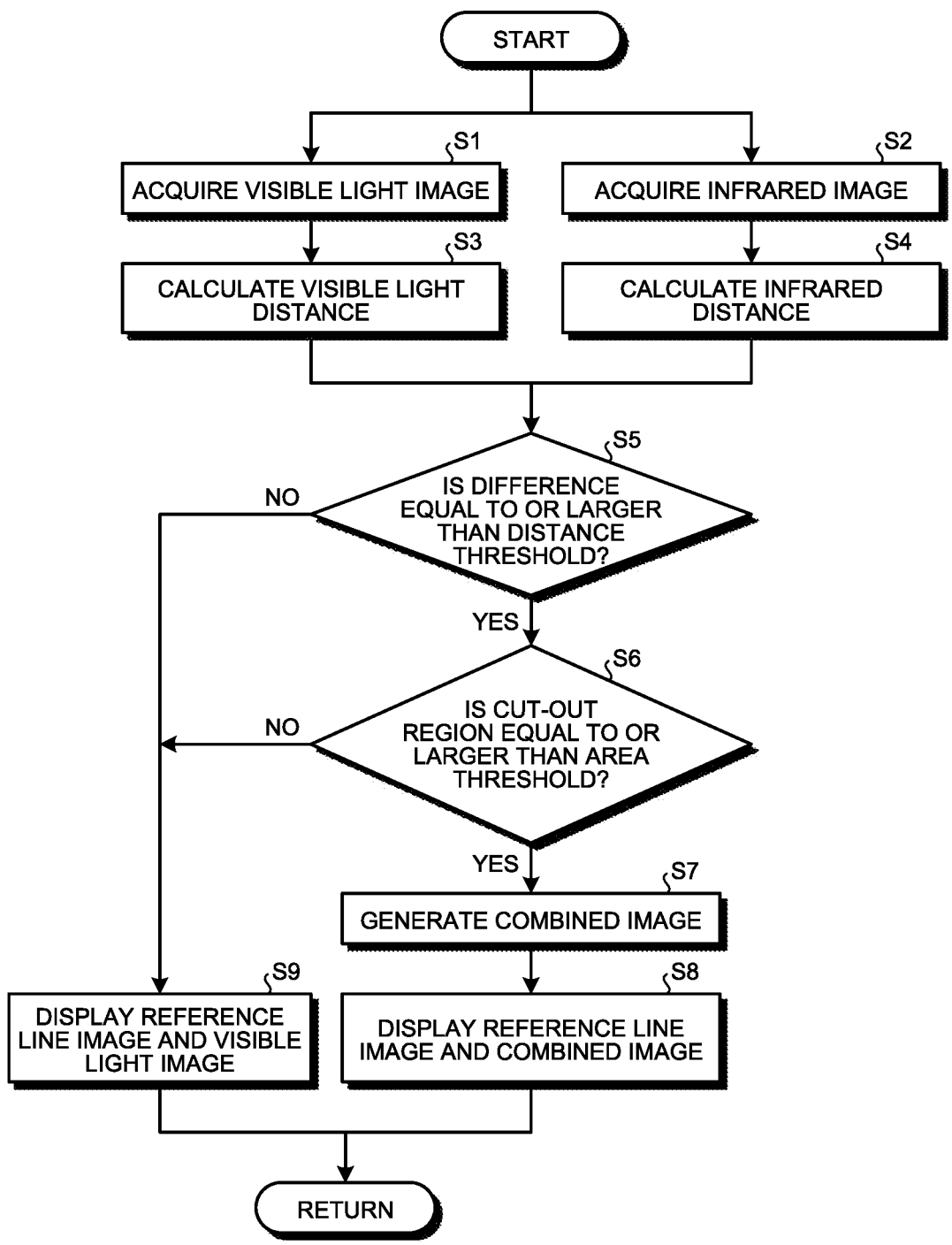
FIG. 12 is a flowchart illustrating a display method according to the embodiment.

FIG. 12 is a flowchart illustrating a display method according to the embodiment.

The visible light imaging device 20 captures an image around the work machine 1. The infrared imaging device 30 captures an image around the work machine 1. The image output unit 304 transmits visible light image data indicating a visible light image Ga captured by the visible light imaging device 20 to the control device 60 via the communication device 7 and the communication system 400. The image output unit 304 transmits infrared image data indicating an infrared image Gb captured by the infrared imaging device 30 to the control device 60 via the communication device 7 and the communication system 400.

The visible light image acquisition unit 62 acquires the visible light image Ga transmitted from the image output unit 304 (Step S1).

The infrared image acquisition unit 63 acquires the infrared image Gb transmitted from the image output unit 304 (Step S2).

For each of a plurality of first partitioned areas Pa defined in the visible light image Ga, the visible light distance calculation unit 64 calculates a visible light distance Da indicating a distance from the visible light imaging device 20 to a first target by performing stereo processing on the visible light image Ga captured by the first visible light camera 21 and the visible light image Ga captured by the second visible light camera 22 (Step S3).

For each of a plurality of second partitioned areas Pb defined in the infrared image Gb to correspond to the first partitioned areas Pa, the infrared distance calculation unit 65 calculates an infrared distance db indicating a distance from the infrared imaging device 30 to a second target by performing stereo processing on the infrared image Gb captured by the first infrared camera 31 and the infrared image Gb captured by the second infrared camera 32 (Step S4).

The determination unit 66 determines whether a difference between the visible light distance Da and the infrared distance db is equal to or larger than a predetermined distance threshold for one of the first partitioned areas Pa and one of the second partitioned areas Pb corresponding to each other. That is, the determination unit 66 determines whether the difference between the visible light distance Da and the infrared distance db is great for one of the first partitioned areas Pa and one of the second partitioned areas Pb corresponding to each other. In addition, the determination unit 66 determines whether there is a second partitioned area Pb in which the difference between the visible light distance Da and the infrared distance db is equal to or larger than the distance threshold (Step S5).

In Step S5, When it is determined that there is a second partitioned area Pb in which the difference between the visible light distance Da and the infrared distance db is equal to or larger than the distance threshold, that is, when it is determined that the difference between the visible light distance Da and the infrared distance db is great (Step S5: Yes), the determination unit 66 determines whether a cut-out region Gc indicating an aggregate of a plurality of second partitioned areas Pb in which the difference between the visible light distance Da and the infrared distance db is equal to or larger than the distance threshold is equal to or larger than a predetermined area threshold. That is, the determination unit 66 determines whether the cut-out region Gc occupying the infrared image Gb has a large size (ratio) (Step S6).

When it is determined in Step S6 that the cut-out region Gc is equal to or larger than the area threshold value (Step S6: Yes), that is, when it is determined that the cut-out region Gc occupying the infrared image Gb has a large size, the combining unit 67 generates a combined image Gd by combining the cut-out region Gc with the visible light image Ga (Step S7).

In addition, the reference line generation unit 68 generates a reference line image Ge indicating a distance from the work machine 1 based on the infrared distance db calculated by the infrared distance calculation unit 65.

The display output unit 69 outputs the combined image Gd to the display device 50 so that the combined image Gd generated by the combining unit 67 is displayed on the display device 50. In addition, the display output unit 69 outputs the reference line image Ge to the display device 50 so that the reference line image Ge generated by the reference line generation unit 68 is displayed on the display device 50. As a result, as illustrated in FIG. 11, the combined image Gd and the reference line image Ge are displayed on the display device 50 (Step S8).

When it is determined in Step S5 that there is no second partitioned area Pb in which the difference between the visible light distance Da and the infrared distance db is equal to or larger than the distance threshold (Step S5: No), the display output unit 69 outputs the visible light image Ga to the display device 50 so that the visible light image Ga is displayed on the display device 50. In addition, the display output unit 69 outputs the reference line image Ge to the display device 50 so that the reference line image Ge generated by the reference line generation unit 68 is displayed on the display device 50. As a result, the visible light image Ga and the reference line image Ge are displayed on the display device 50 (Step S9).

In Step S6, when it is determined that the cut-out region Gc is smaller than the area threshold, that is, when it is determined that the cut-out region Gc occupying the infrared image Gb has a small size (Step S6: No), the display output unit 69 outputs the visible light image Ga to the display device 50 so that the visible light image Ga is displayed on the display device 50. In addition, the display output unit 69 outputs the reference line image Ge to the display device 50 so that the reference line image Ge generated by the reference line generation unit 68 is displayed on the display device 50. As a result, the visible light image Ga and the reference line image Ge are displayed on the display device 50 (Step S9).

That is, in the embodiment, even if there is a second partitioned area Pb in which the difference between the visible light distance Da and the infrared distance db is equal to or larger than the distance threshold, when the number of second partitioned areas Pb is small, that is, when the cut-out region Gc is small, no combined image Gd is displayed on the display device 50, and the visible light image Ga is displayed on the display device 50. In other words, even if dust is generated, when a region of the imaging target blocked by the dust is small, no combined image Gd is displayed on the display device 50, and the visible light image Ga is displayed on the display device 50.

Note that the processing of Step S6 may be omitted.

[Computer System]

Figure 13:
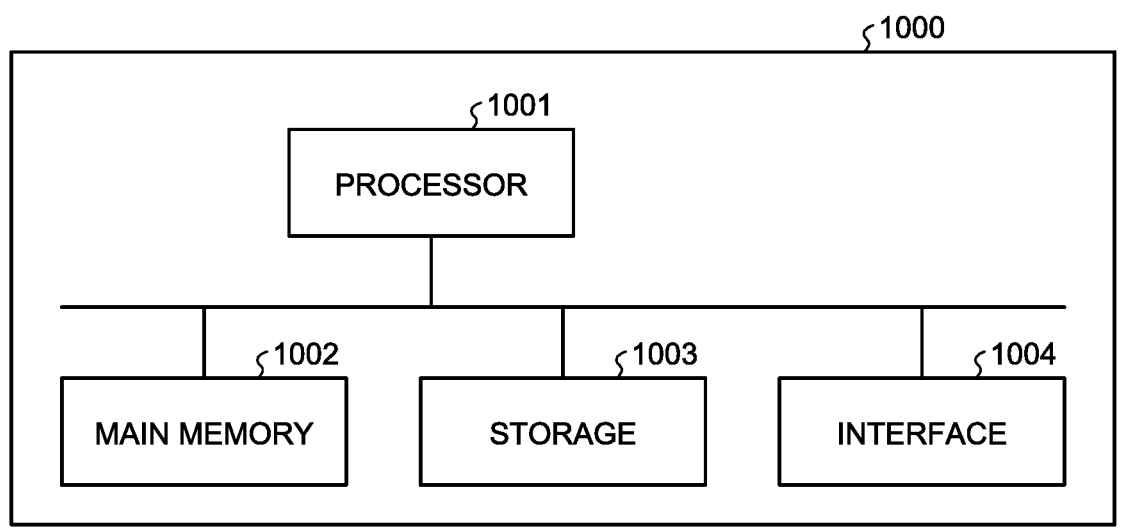
FIG. 13 is a block diagram illustrating a computer system according to the embodiment.

FIG. 13 is a block diagram illustrating a computer system 1000 according to the embodiment. The control device 60 described above includes a computer system 1000. The computer system 1000 includes a processor 1001 such as a central processing unit (CPU), a main memory 1002 including a nonvolatile memory such as a read only memory (ROM) and a volatile memory such as a random access memory (RAM), a storage 1003, and an interface 1004 including an input/output circuit. The function of the control device described above is stored in the storage 1003 as a computer program. The processor 1001 reads the computer program from the storage 1003, develops the computer program in the main memory 1002, and executes the above-described processing according to the program. Note that the computer program may be distributed to the computer system 1000 via a network.

According to the above-described embodiment, the computer program or the computer system 1000 can execute: acquiring a visible light image Ga indicating an image of a first target captured by the visible light imaging device that captures the image in a predetermined range from the work machine 1; acquiring an infrared image Gb indicating an image of a second target captured by the infrared imaging device 30 that captures the image in the predetermined range from the work machine 1; calculating a visible light distance Da indicating a distance from the visible light imaging device 20 to the first target for each of a plurality of first partitioned areas Pa defined in the visible light image Ga; calculating an infrared distance db indicating a distance from the infrared imaging device 30 to the second target for each of a plurality of second partitioned areas Pb defined to correspond to the first partitioned areas Pa in the infrared image Gb; determining whether a difference between the visible light distance Da and the infrared distance db is equal to or larger than a distance threshold for one of the first partitioned areas Pa and one of the second partitioned areas Pb corresponding to each other; generating a combined image Gd by combining the second partitioned area Pb in which the difference is equal to or larger than the distance threshold with the visible light image Ga; and outputting the combined image Gd so that the combined image Gd is displayed on the display device 50.

[Effects]

As described above, in a situation where an event in which the visible light image Ga is unclear does not occur, the visible light image Ga is displayed on the display device 50 as described in Step S9. The visible light image Ga is a color image, and the visible light image Ga has a higher resolution than the infrared image Gb. That is, the visible light image Ga has a superior visibility to the infrared image Gb. Therefore, in a situation where an event in which the visible light image Ga is unclear does not occur, the display system 10 displays the visible light image Ga on the display device 50. As a result, the display system 10 can provide the situation around the work machine 1 to the operator of the work machine 1.

In a situation where an event in which the visible light image Ga is unclear occurs, the combined image Gd of the visible light image Ga and the infrared image Gb is displayed on the display device 50 as described in Step S8. Only an unclear partial region of the visible light image Ga is replaced with the infrared image Gb. As described above, the visibility of the visible light image Ga is excellent. Since only an unclear partial region of the visible light image Ga is replaced with the infrared image Gb, rather than replacing the entire region of the visible light image Ga with the infrared image Gb, as described above, the visibility of the combined image Gd is maintained in a favorable state.

The partial region of the visible light image Ga to be replaced with the infrared image Gb is determined based on the difference between the visible light distance Da and the infrared distance db. When a region having a large difference between the visible light distance Da and the infrared distance db exists in the visible light image Ga and the infrared image Gb, the visible light image Ga and the infrared image Gb are combined. As a result, only the unclear partial region of the visible light image Ga is appropriately replaced with the infrared image Gb. The display system 10 can provide the situation around the work machine 1 to the operator of the work machine 1.

Other Embodiments

In the above-described embodiment, the event in which the image captured by the visible light imaging device 20 is unclear results from dust. Examples of the event in which the image captured by the visible light imaging device 20 is unclear include not only generation of dust, but also generation of fog, an insufficient amount of visible light due to work performed by the work machine at night, and a backlit state of the imaging target.

In a case where fog particles (water droplets) exist in the space between the visible light imaging device and the infrared imaging device 30 and the imaging target, it is difficult for visible light to transmit through the fog particles, but infrared light can transmit through the fog particles. Therefore, the display system may generate a combined image Gd according to the above-described embodiment. Even if an event in which at least a part of the visible light image Ga captured by the visible light imaging device 20 is unclear occurs, the display system 10 can provide a situation around the work machine 1 to the operator of the work machine 1 by displaying the combined image Gd on the display device 50.

In a case where the amount of visible light is insufficient, pixels in the image sensor of the visible light imaging device 20 have an excessively low luminance. That is, a so-called black defect occurs. In this case, it is difficult for the visible light distance calculation unit 64 to perform stereo processing on the visible light image Ga captured by the first visible light camera 21 and the visible light image Ga captured by the second visible light camera 22. That is, when the amount of visible light is insufficient, it is difficult for the visible light distance calculation unit 64 to calculate a visible light distance Da. On the other hand, the infrared distance calculation unit 65 can calculate an infrared distance db by performing stereo processing on the infrared image Gb captured by the first infrared camera 31 and the infrared image Gb captured by the second infrared camera 32. Also in a case where the amount of visible light is insufficient, a difference occurs between the visible light distance Da and the infrared distance db, and thus, the display system 10 can generate a combined image Gd according to the above-described embodiment.

In a case where the imaging target is in a backlit state, pixels in the image sensor of the visible light imaging device 20 have an excessive luminance. That is, so-called overexposure occurs. In this case, it is difficult for the visible light distance calculation unit 64 to perform stereo processing on the visible light image Ga captured by the first visible light camera 21 and the visible light image Ga captured by the second visible light camera 22. That is, when the imaging target is in the backlit state, it is difficult for the visible light distance calculation unit 64 to calculate a visible light distance Da. On the other hand, the infrared distance calculation unit 65 can calculate an infrared distance db by performing stereo processing on the infrared image Gb captured by the first infrared camera 31 and the infrared image Gb captured by the second infrared camera 32. Also in a case where the imaging target is in the backlit state, a difference occurs between the visible light distance Da and the infrared distance db, and thus, the display system can generate a combined image Gd according to the above-described embodiment.

In the above-described embodiment, the visible light distance calculation unit 64 calculates a visible light distance Da by performing stereo processing on the visible light image Ga captured by the first visible light camera 21 and the visible light image Ga captured by the second visible light camera 22. A distance detection device such as a laser sensor (light detection and ranging (LIDAR)) may be provided in the work machine 1. The laser sensor detects a distance using laser light in a wavelength range of visible light. The visible light distance calculation unit 64 can calculate a visible light distance Da from the visible light imaging device 20 to the first target for each of the plurality of first partitioned areas Pa defined in the visible light image Ga based on data detected by the distance detection device. When the distance detection device is provided, one of the first visible light camera 21 and the second visible light camera 22 of the visible light imaging device 20 may be omitted.

In the above-described embodiment, one first partitioned area Pa may be one pixel of the visible light image Ga or a combination of a plurality of pixels of the visible light image Ga. One second partitioned area Pb may be one pixel of the infrared image Gb or a combination of a plurality of pixels of the infrared image Gb. Furthermore, the first partitioned areas Pa may be defined not based on the pixels of the visible light image Ga. The second partitioned areas Pb may be defined not based on the pixels of the infrared image Gb. It is only required that the plurality of first partitioned areas Pa and the plurality of second partitioned areas Pb correspond to each other on a one-to-one basis.

In the above-described embodiment, the display system 10 is applied to the remote operation system 100. The display device 50 may not be disposed in the remote operation chamber 200. The display device 50 may be disposed in an operation chamber (cab) of the work machine 1. In addition, some of the functions of the control device 60 described in the above-described embodiment may be provided in the work machine 1. The operator boarding the operation chamber of the work machine 1 can operate a boarding operation device disposed in the operation chamber of the work machine 1 while checking the display device 50 disposed in the operation chamber of the work machine 1. Also in this case, even if an event in which the visible light image Ga captured by the visible light imaging device is unclear occurs, the display system 10 can provide a situation around the work machine 1 to the operator of the work machine 1.

In the above-described embodiment, the work machine 1 is an excavator. The work machine 1 may be a bulldozer, a wheel loader, or a dump truck.

REFERENCE SIGNS LIST

1 WORK MACHINE
2 TRAVELING BODY
3 SWING BODY
4 WORKING EQUIPMENT
4A BOOM
4B ARM
4C BUCKET
5 HYDRAULIC CYLINDER
5A BOOM CYLINDER
5B ARM CYLINDER
5C BUCKET CYLINDER
6 COMMUNICATION DEVICE
7 COMMUNICATION DEVICE
10 DISPLAY SYSTEM
20 VISIBLE LIGHT IMAGING DEVICE
21 FIRST VISIBLE LIGHT CAMERA
22 SECOND VISIBLE LIGHT CAMERA
30 INFRARED IMAGING DEVICE
31 FIRST INFRARED CAMERA
32 SECOND INFRARED CAMERA
40 REMOTE OPERATION DEVICE
45 OPERATION SEAT
50 DISPLAY DEVICE
60 CONTROL DEVICE
61 OPERATION SIGNAL OUTPUT UNIT
62 VISIBLE LIGHT IMAGE ACQUISITION UNIT
63 INFRARED IMAGE ACQUISITION UNIT
64 VISIBLE LIGHT DISTANCE CALCULATION UNIT
65 INFRARED DISTANCE CALCULATION UNIT
66 DETERMINATION UNIT
67 COMBINING UNIT
68 REFERENCE LINE GENERATION UNIT
69 DISPLAY OUTPUT UNIT
100 REMOTE OPERATION SYSTEM
200 REMOTE OPERATION CHAMBER
300 CONTROL DEVICE
301 TRAVELING BODY CONTROL UNIT
302 SWING BODY CONTROL UNIT
303 WORKING EQUIPMENT CONTROL UNIT
304 IMAGE OUTPUT UNIT
400 COMMUNICATION SYSTEM
Da VISIBLE LIGHT DISTANCE
db INFRARED DISTANCE
Ga VISIBLE LIGHT IMAGE
Gb INFRARED IMAGE
Gc CUT-OUT REGION
Gd COMBINED IMAGE
Ge REFERENCE LINE IMAGE
Pa FIRST PARTITIONED AREA
Pb SECOND PARTITIONED AREA
RX SWING AXIS

The invention claimed is:

1. A display system comprising:
a visible light image acquisition unit that acquires a visible light image indicating an image of a first target captured by a visible light imaging device provided in a work machine;
an infrared image acquisition unit that acquires an infrared image indicating an image of a second target captured by an infrared imaging device provided in the work machine;
a visible light distance calculation unit that calculates a visible light distance indicating a distance from the visible light imaging device to the first target for each of a plurality of first partitioned areas defined in the visible light image;
an infrared distance calculation unit that calculates an infrared distance indicating a distance from the infrared imaging device to the second target for each of a plurality of second partitioned areas defined in the infrared image to correspond to the first partitioned areas;
a determination unit that determines whether a difference between the visible light distance and the infrared distance is equal to or larger than a distance threshold for one of the first partitioned areas and one of the second partitioned areas corresponding to each other;
a combining unit that combines the second partitioned area in which the difference is equal to or larger than the distance threshold with the visible light image to generate a combined image; and
a display output unit that outputs the combined image such that the combined image is displayed on a display device,
wherein the combining unit combines the second partitioned area with the visible light image such that the second partitioned area in which the difference is equal to or larger than the distance threshold is superimposed on the first partitioned area of the visible light image corresponding to the second partitioned area.

2. The display system according to claim 1, wherein the combined image includes the second partitioned area in which the difference is equal to or larger than the distance threshold and the first partitioned area in which the difference is smaller than the distance threshold.

3. The display system according to claim 1, wherein the visible light imaging device includes a first visible light camera and a second visible light camera, and
the visible light distance calculation unit calculates the visible light distance by performing stereo processing on a visible light image captured by the first visible light camera and a visible light image captured by the second visible light camera.

4. The display system according to claim 1, wherein the infrared imaging device includes a first infrared camera and a second infrared camera, and the infrared distance calculation unit calculates the infrared distance by performing stereo processing on an infrared image captured by the first infrared camera and an infrared image captured by the second infrared camera.

5. The display system according to claim 1, further comprising a reference line generation unit that generates a reference line image indicating a distance from the work machine based on the infrared distance, wherein the display output unit outputs the reference line image such that the reference line image is displayed on the display device.

6. A display method comprising:

acquiring a visible light image indicating an image of a first target captured by a visible light imaging device provided in a work machine;

acquiring an infrared image indicating an image of a second target captured by an infrared imaging device provided in the work machine;

calculating a visible light distance indicating a distance from the visible light imaging device to the first target for each of a plurality of first partitioned areas defined in the visible light image;

calculating an infrared distance indicating a distance from the infrared imaging device to the second target for each of a plurality of second partitioned areas defined in the infrared image to correspond to the first partitioned areas;

determining whether a difference between the visible light distance and the infrared distance is equal to or larger than a distance threshold for one of the first partitioned areas and one of the second partitioned areas corresponding to each other;

combining the second partitioned area in which the difference is equal to or larger than the distance threshold with the visible light image to generate a combined image; and outputting the combined image such that the combined image is displayed on a display device, wherein the display method further comprises: combining the second partitioned area with the visible light image such that the second partitioned area in which the difference is equal to or larger than the distance threshold is superimposed on the first partitioned area of the visible light image corresponding to the second partitioned area.

7. A display system comprising:

a visible light image acquisition unit that acquires a visible light image indicating an image of a first target captured by a visible light imaging device provided in a work machine;

an infrared image acquisition unit that acquires an infrared image indicating an image of a second target captured by an infrared imaging device provided in the work machine;

a visible light distance calculation unit that calculates a visible light distance indicating a distance from the visible light imaging device to the first target for each of a plurality of first partitioned areas defined in the visible light image;

an infrared distance calculation unit that calculates an infrared distance indicating a distance from the infrared imaging device to the second target for each of a plurality of second partitioned areas defined in the infrared image to correspond to the first partitioned areas;

a determination unit that determines whether a difference between the visible light distance and the infrared distance is equal to or larger than a distance threshold for one of the first partitioned areas and one of the second partitioned areas corresponding to each other;

a combining unit that combines the second partitioned area in which the difference is equal to or larger than the distance threshold with the visible light image to generate a combined image;

a display output unit that outputs the combined image such that the combined image is displayed on a display device; and a reference line generation unit that generates a reference line image indicating a distance from the work machine based on the infrared distance, wherein the display output unit outputs the reference line image such that the reference line image is displayed on the display device.

8. The display system according to claim 7, wherein the combined image includes the second partitioned area in which the difference is equal to or larger than the distance threshold and the first partitioned area in which the difference is smaller than the distance threshold.

9. The display system according to claim 7, wherein the visible light imaging device includes a first visible light camera and a second visible light camera, and the visible light distance calculation unit calculates the visible light distance by performing stereo processing on a visible light image captured by the first visible light camera and a visible light image captured by the second visible light camera.

10. The display system according to claim 7, wherein the infrared imaging device includes a first infrared camera and a second infrared camera, and the infrared distance calculation unit calculates the infrared distance by performing stereo processing on an infrared image captured by the first infrared camera and an infrared image captured by the second infrared camera.

* * * * *